(12) United States Patent
Troisi et al.

(10) Patent No.: US 8,247,711 B2
(45) Date of Patent: Aug. 21, 2012

(54) INTERMITTENT MOTION CHECKWEIGHER WITH OFFSET PRODUCT POCKETS

(75) Inventors: David Troisi, Ithaca, NY (US); Josh White, Ithaca, NY (US)

(73) Assignee: Mettler-Toledo, LLC, Columbus, OH (US)

(*) Notice: Subject to any disclaimer, the term of this patent is extended or adjusted under 35 U.S.C. 154(b) by 355 days.

(21) Appl. No.: 12/641,174

(22) Filed: Dec. 17, 2009

(65) Prior Publication Data

US 2011/0147097 A1 Jun. 23, 2011

(51) Int. Cl.
*G01G 19/00* (2006.01)
(52) U.S. Cl. .......... 177/145; 198/346.2; 198/459.8; 198/434; 177/50; 177/54; 177/262
(58) Field of Classification Search .......... 177/54, 177/145, 199, 253, 262, 50; 198/346.2, 459.8, 198/434; 221/277; 414/795; 702/101, 102; 73/1.13, 1.15
See application file for complete search history.

(56) References Cited

U.S. PATENT DOCUMENTS

| | | | | |
|---|---|---|---|---|
| 2,570,198 A | | 10/1951 | Brager | |
| 4,230,195 A | * | 10/1980 | Graffin | 177/1 |
| 4,407,379 A | * | 10/1983 | Pryor et al. | 177/52 |
| 4,682,664 A | * | 7/1987 | Kemp | 177/16 |
| 4,715,412 A | * | 12/1987 | Perazzo | 141/1 |
| 5,004,093 A | * | 4/1991 | Blezard | 198/430 |
| 5,236,337 A | * | 8/1993 | Kikuchi et al. | 177/52 |
| 5,740,843 A | * | 4/1998 | Burkart | 141/79 |
| 5,750,938 A | * | 5/1998 | De Caris et al. | 177/50 |
| 6,168,004 B1 | | 1/2001 | Drewitz et al. | |
| 7,331,210 B2 | * | 2/2008 | Dietrich | 73/1.13 |
| 2010/0200306 A1 | * | 8/2010 | Trebbi | 177/1 |
| 2010/0314177 A1 | * | 12/2010 | Troisi et al. | 177/52 |

FOREIGN PATENT DOCUMENTS

| | | |
|---|---|---|
| CN | 201340295 Y | 11/2009 |
| GB | 1424344 A | 2/1976 |
| WO | 2009/040634 A1 | 4/2009 |

OTHER PUBLICATIONS

Mettler-Toledo Hi-Speed, Starweigh, Checkweighers, 2009, 2 pages, Mettler-Toledo Hi-Speed, Ithaca, New York.

* cited by examiner

*Primary Examiner* — Randy W Gibson
(74) *Attorney, Agent, or Firm* — Standley Law Group LLP

(57) ABSTRACT

An intermittent motion checkweigher for weighing products of interest. The checkweigher includes a product transport wheel having a plurality of product retention pockets, each of which retains one or more products of interest throughout the weighing operation. Products are loaded into a product retention pocket by an in-feed conveyor or similar device, after which the product transport wheel is indexed to advance the products in the product retention pocket toward one or more weighing devices where the products will be weighed while still located in the product retention pocket. After weighing, the products are advanced to a discharge conveyor or similar device by further indexing of the product transport wheel.

21 Claims, 6 Drawing Sheets

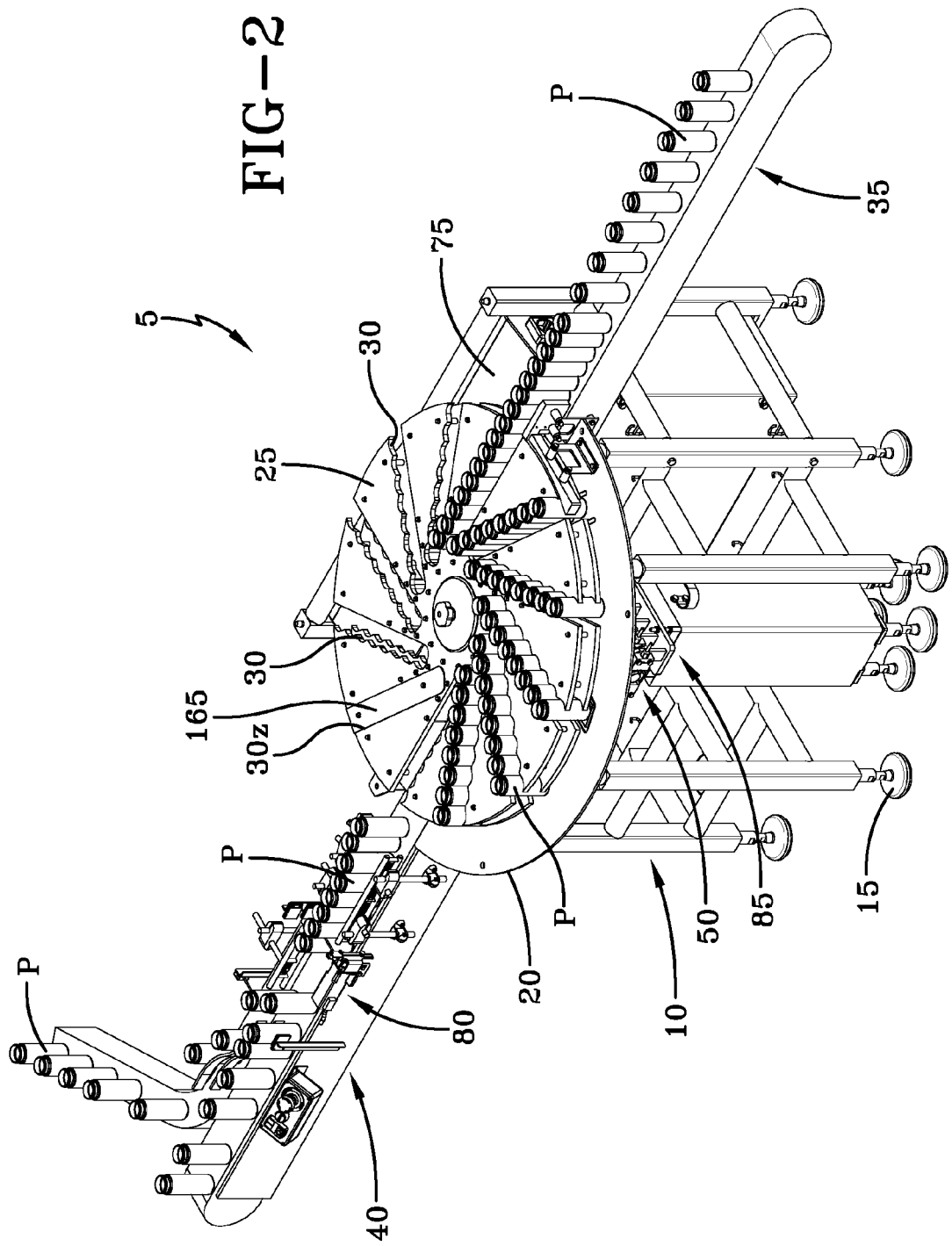

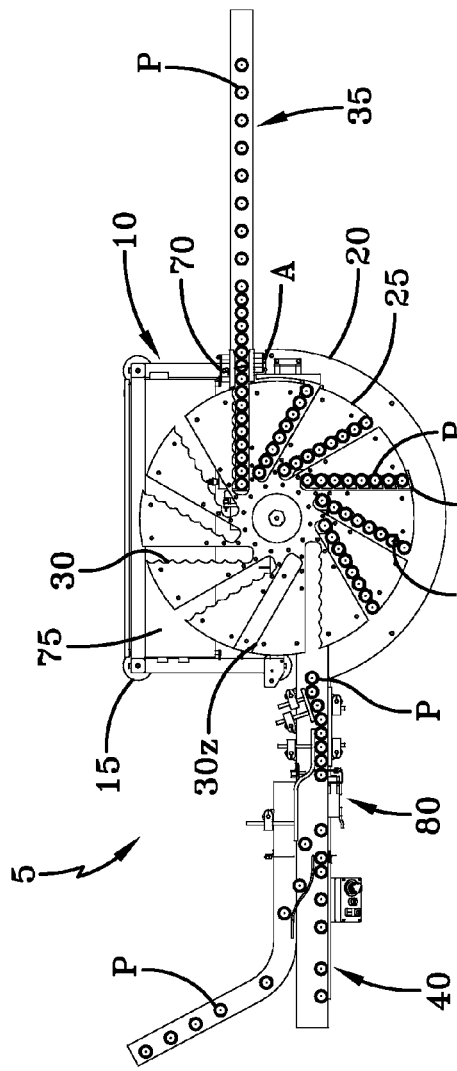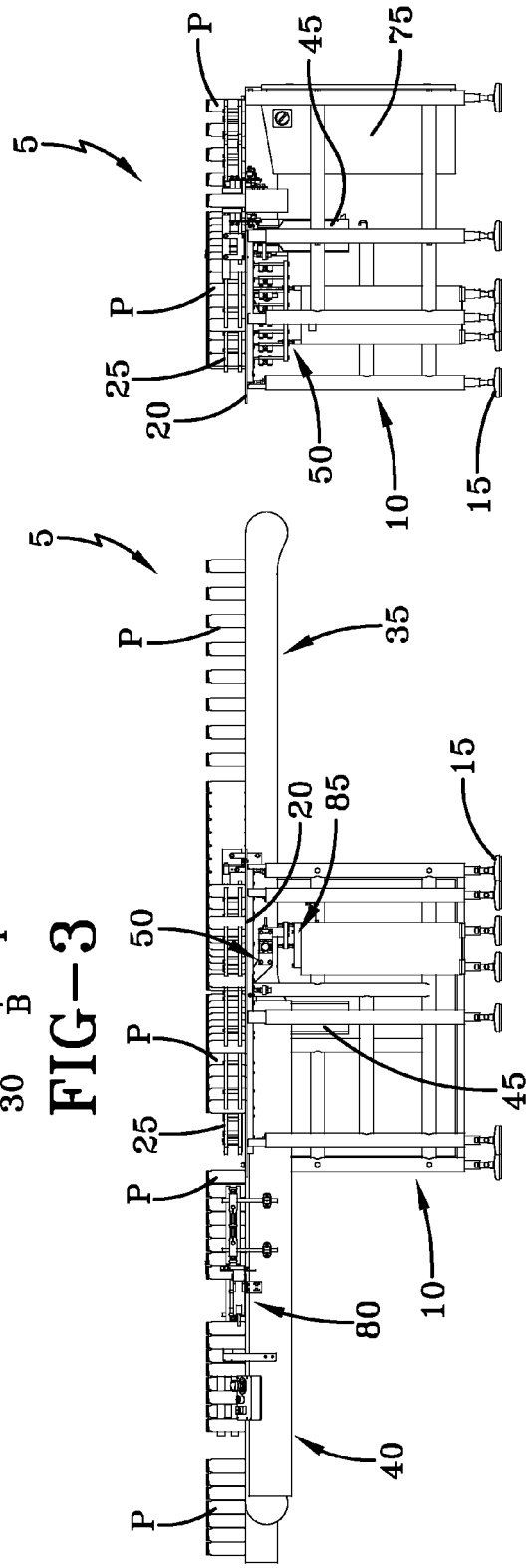

INTERMITTENT MOTION CHECKWEIGHER WITH OFFSET PRODUCT POCKETS

TECHNICAL FIELD

The present invention is directed to the field of checkweighers for weighing products of interest. More particularly, the present invention is directed to an intermittent motion checkweigher having a rotating product transport wheel with offset product retention pockets.

BACKGROUND

There are various manufacturing operations where it is required that 100% of the products produced thereby are weighed. Such weighing operations may be desired or required, for example, due to the high value of a particular product and/or for regulatory compliance.

Obviously, removing and individually weighing every product produced in a modern high-speed manufacturing operation is impractical. Therefore, devices for weighing products at high speed during a manufacturing or packaging operation have been developed and are known in the art. These devices include inline checkweighers where products to be weighed are passed over a weighpan while traveling along a conveyor or similar transport device. The products are appropriately spaced and the weighing components of the checkweigher are fast enough to allow the weight of each product passing over the weighpan to be detected.

Because such inline checkweighers weigh products while said products are in motion, the weight readings produced thereby are typically not as accurate as weight readings produced by static weighing devices. Consequently, the assignee of the present application has developed and markets an intermittent motion checkweigher that uses a rotating wheel to transport products to be weighed from an in-feed conveyor, across one or more weighing devices (e.g., load cells), to a discharge conveyor, where the products may be rejected or transferred downstream for further processing, packaging or shipping. The rotating wheel does not move the products continuously but, rather, moves with an indexing motion that allows a product (or row of products) to briefly rest over an associated weighing device. This allows a product to be weighed while the product is static. The products to be weighed by this intermittent motion checkweigher typically, but not necessarily, reside in some form of a container. One example of such a known intermittent motion checkweigher is illustrated in FIG. 1.

While this known intermittent motion checkweigher provides for highly accurate weighing, and has been commercially successful, its use is not entirely without drawbacks. For example, as can be observed in FIG. 1, the design of the known intermittent motion checkweigher makes use of an overhead mounted drive motor and product transport wheel. This overhead configuration inherently causes a loss of sight of a product when the product reaches the back side of the rotating wheel, and can complicate changing of the rotating wheel when such is required for processing products of different sizes or for cleaning purposes. Further, such an overhead configuration makes the integration and use of a filler device impractical, if not impossible. The known intermittent motion checkweigher is also designed to mount over an existing conveyor, meaning that the entire checkweigher must typically be lifted over the conveyor during installation. This installation technique and the fact that the in-feed and discharge locations of the rotating wheel are diametrically opposed typically also requires that the existing conveyor be cut in order to accommodate the checkweigher.

While the assignee's known intermittent motion checkweigher produces good results, it is nonetheless realized that improvements may be made thereto. Therefore, the present invention is directed to an intermittent motion checkweigher for providing highly accurate weight measurements of products of interest while overcoming at least the drawbacks described above.

SUMMARY OF THE GENERAL INVENTIVE CONCEPT

An intermittent motion checkweigher of the present invention is designed to accurately weigh one or more products while said products are in a static condition. As used herein, the term "product" generally refers to a container holding some amount or number of an item of interest. However, in some applications, "product" may also refer to the item itself. That is, it is possible that certain items (e.g., coins) to be weighed by an intermittent motion checkweigher of the present invention may not reside in containers during weighing.

An intermittent motion checkweigher of the present invention utilizes a frame design that permits the drive motor to be mounted below a rotating product transport wheel. This also allows for a frame of increased strength and rigidity in comparison to the frame of the known intermittent motion checkweigher. Locating the drive motor beneath the product transport wheel also eliminates any loss of sight of a product as it is indexed around the wheel. Since the drive motor and product transport wheel are no longer cantilevered from overhead, an intermittent motion checkweigher of the present invention can process heavier products and may provide increased throughput.

An intermittent motion checkweigher of the present invention also makes use of a product transport wheel having a plurality of offset product retention pockets that lead from its circumferential edge. These pockets receive products to be weighed from an in-feed conveyor or similar apparatus and retains the products while the product transport wheel indexes the products across an associated weighing device(s) and transfers the products to a discharge conveyor for further action. The product retention pockets may be designed to hold one or a plurality of products simultaneously.

Because the product retention pockets are offset, the in-feed conveyor and discharge conveyor associated with an intermittent motion checkweigher of the present invention need not be aligned. Rather, the in-feed and discharge conveyors may be offset, which allows for installation of a an intermittent motion checkweigher of the present invention into a production line without the need to cut into an existing conveyor. This offset product retention pocket design also offers other advantages that are described in more detail below. These advantages and other details of an intermittent motion checkweigher of the present invention are discussed in the detailed description of exemplary embodiments that follow, and are illustrated in the accompanying drawing figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIGS. 2-5 are perspective, top, front and side views, respectively, of one exemplary embodiment of an intermittent motion checkweigher of the present invention;

DETAILED DESCRIPTION OF EXEMPLARY EMBODIMENT(S)

Figure 1:
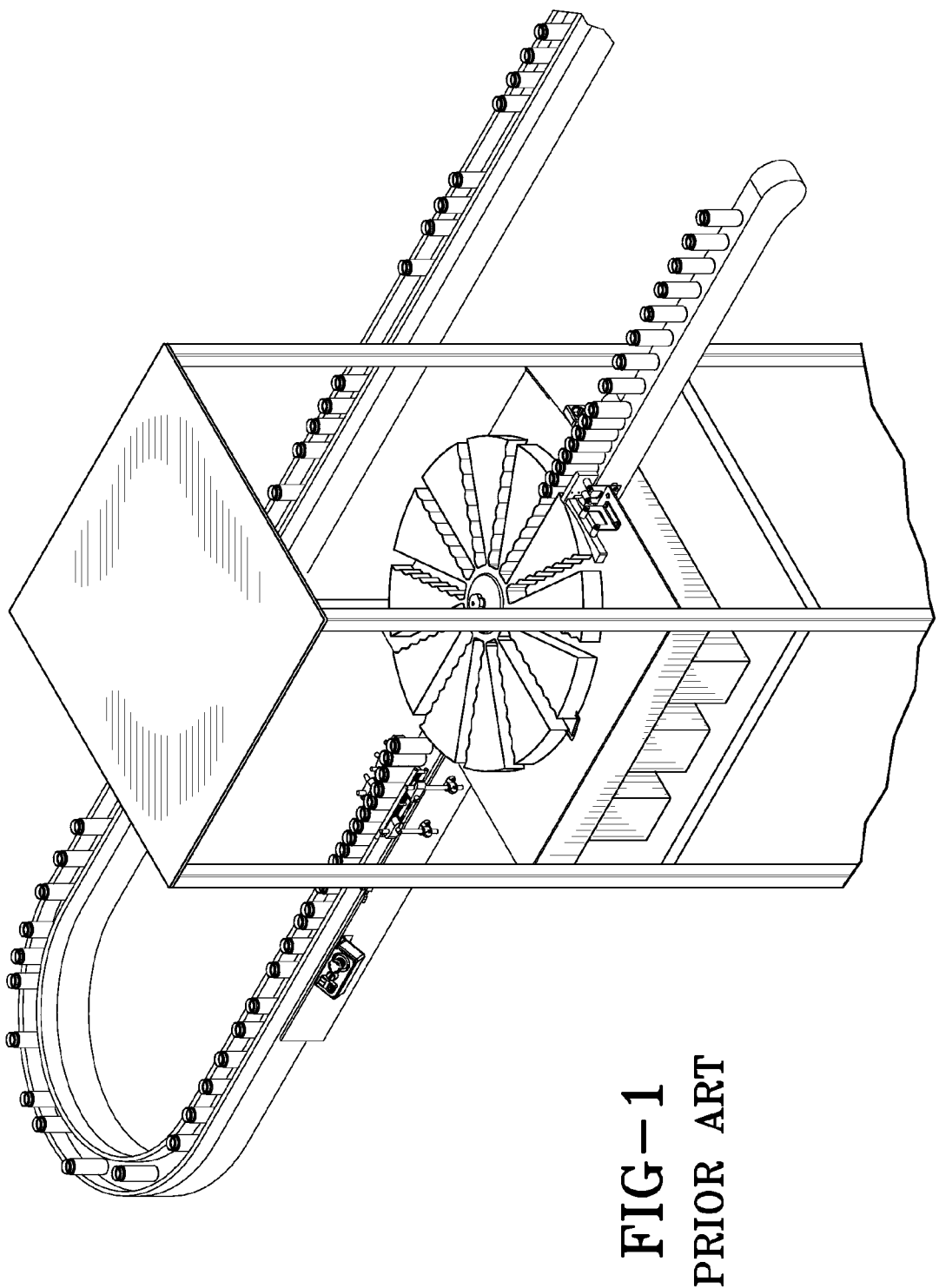
FIG. 1 illustrates one example of a known intermittent motion checkweigher.

One exemplary embodiment of an intermittent motion checkweigher 5 of the present invention is depicted in FIGS. 2-6. As can be observed, the checkweigher 5 includes a substantially rigid frame 10 for supporting various working components. The frame 10 may be constructed of any material and by any technique known the art as being suitable for such a purpose. Leveling components 15 and/or other mounting components may be associated with the frame 10 for facilitating proper installation of the checkweigher 5.

The frame also supports a top plate 20, which provides the surface upon which products to be weighed are supported as they travel through the checkweigher 5. As can be best observed in FIGS. 2-3, the top plate 20 underlies a portion of a product transport wheel 25, which is described in more detail below. The top plate 20 is shown to be substantially round in shape in this particular embodiment, but other shapes are also possible as long as the top plate is able to provide the required support surface for products to be weighed by the checkweigher 5.

The top plate 20 may be constructed from a variety of materials, including without limitation, metals, plastics and composites. However, the selected material should exhibit sufficient strength and rigidity to support any products to be weighed by the checkweigher 5. The top plate of certain embodiments of the present invention may be manufactured from a low-friction material or may include a low-friction coating on the product support surface thereof to facilitate product movement.

Referring still to FIGS. 2-6, it can be seen that a product transport wheel 25 resides and rotates above the top plate 20. The product transport wheel 25 is supported and rotated by a drive motor 45 that is mounted beneath the product transport wheel. In this embodiment, the drive motor 45 is mounted to a portion of the frame 10, but other mounting techniques may also be possible. The drive motor 45 may be any motor that can be indexed as described below. Preferably, however, the drive motor 45 is an electric servo motor, which would be quite familiar to one of skill in the art.

The product transport wheel 25 may be comprised of two discrete plates separated by spacers (as best shown in FIG. 2), or may be constructed as a solid plate. The former construction obviously reduces the weight of the product transport wheel 25, but it is possible that certain heavier products may benefit from the use of a solid wheel. As with the top plate 20, the product transport wheel 25 may be manufactured from a variety of materials, as long as the selected material exhibits sufficient strength and rigidity, and meets any particular requirements associated with the environment in which the checkweigher 5 is installed. For example, certain applications, such as those in the pharmaceutical and food industries, may require the use of particular materials to facilitate cleaning and minimize contamination.

A product transport wheel of a checkweigher of the present invention is provided with a plurality of product retention pockets that extend inward from the circumferential edge of the wheel. The number of product retention pockets may vary depending on the size of the products to be weighed and the diameter of the wheel.

The inward extending distance (depth) of the product retention pockets of a checkweigher of the present invention may be varied according to the number of products to be simultaneously weighed by the checkweigher. Therefore, while the depth of the product retention pockets 30 shown in the particular checkweigher 5 of FIGS. 2-6 is sufficient to simultaneously retain eight products, it should be understood that the product retention pockets may be designed to retain a lesser or greater number of products (which may, or may not, require a change in the size of the product transport wheel 25). For example, in certain applications, it may be desirable that each product retention pocket retains only one product.

Embodiments of the present invention may also include intermediate product retention pockets (not shown) of reduced depth located between product retention pockets of normal (full) depth. This would allow a given product transport wheel to simultaneously retain a greater number of products than would be possible if only full depth pockets were provided. When such intermediate product retention pockets are present, the drive motor may be programmed to index the product transport wheel in what may be described as half steps, to allow for weighing of products retained in the intermediate product retention pockets. In addition to increasing product transport wheel capacity, the use of intermediate product retention pockets may also improve handling of tall products because both acceleration and deceleration of the product transport wheel would be accordingly reduced by the reduction in indexing step distance. Intermediate product retention pockets may be used with a product transport wheel having full depth product retention pockets of radial or offset orientation (as described in more detail below).

The product retention pockets of a checkweigher of the present invention may be directed radially inward toward the center of the product transport wheel. Alternatively, and as shown in FIGS. 2-6, such a product transport wheel 25 may be provided with a plurality of offset product retention pockets 30. The term "offset," as used herein, is intended to mean that the product retention pockets 30 do not extend radially toward the center of the product transport wheel 25. Rather, each product retention pocket 30 extends angularly inward some distance along a path that, if extended, would form a chord connecting two non-diametrically opposed points on the circumference of the product transport wheel 25.

The use of a product transport wheel with offset product retention pockets provides a number of advantages. For example, and without limitation, the use of offset product retention pockets allows the in-feed conveyor and discharge conveyor used with the associated checkweigher to also be offset, which permits for installation of the checkweigher into a production line without the need to cut into an existing conveyor.

The ability to use offset in-feed and discharge conveyors also allows the in-feed conveyor velocity to be different from the discharge conveyor velocity. Employing a higher discharge conveyor velocity allows a group of products to be discharged from the product transport wheel more quickly. As product discharge is typically the bottleneck point for an intermittent motion checkweigher of the present invention, this allows for faster indexing and weighing of products than would otherwise be possible with a single conveyor. Employing a higher discharge conveyor velocity also provides greater flexibility for processing tall, difficult to handle, or unstable products. A higher discharge conveyor velocity may also be employed to separate products for easier downstream rejection of individual products. Offsetting the in-feed conveyor and discharge conveyors also allows the drive motor to be mounted below the product transport wheel without interference.

Further, the use of offset product retention pockets permits a greater number of pockets to be placed in a single product transport wheel, which allows for the retention of a greater number of products than would be possible using a wheel of like diameter having radial pockets. Consequently, it may be possible to employ a product transport wheel of reduced diameter, which results in a wheel of less weight and may permit the use of a smaller drive motor.

The checkweigher 5 is shown in FIGS. 2-8 in conjunction with an in-feed conveyor 35 and a discharge conveyor 40. The in-feed conveyor 35 and discharge conveyor 40 are not part of the present invention, but such devices will generally be used in conjunction therewith. It is to be realized that conveyors used in various installations of a checkweigher of the present invention may be similar to or quite different from the conveyors 35, 40 depicted in the drawing figures, as the design, appearance and construction of such conveyors may be largely dependent on the products transported thereby. Further, devices other than traditional conveyors may be used to supply products to and discharge products from a checkweigher of the present invention. Consequently, a checkweigher of the present invention is in no way limited to use with an in-feed conveyor 35 and discharge conveyor 40 like that shown in the drawing figures.

The in-feed and discharge conveyors 35, 40 are aligned with selected product retention pocket positions so as to define the locations at which products P will be introduced to and removed from this particular checkweigher installation. In this exemplary installation, it is desired that the upstream and downstream product flows associated with the in-feed and discharge conveyors 35, 40, respectively, move in substantially the same direction. Consequently, The in-feed and discharge conveyors 35, 40 of this exemplary embodiment are arranged substantially in parallel. In other installations of a checkweigher 5 of the present invention, the in-feed and discharge conveyors may be arranged at an angle that results in a change in the direction of product flow (see e.g., FIG. 7).

It can be seen from the drawing figures that both the in-feed conveyor 35 and discharge conveyor 40 extend beneath the product transport wheel 25 by some distance. The top plate 20 is designed to accommodate passage of the conveyors 35, 40. The distance by which the in-feed and discharge conveyors extend beneath a product transport wheel may be adjusted based on the depth of the product retention pockets thereof. Alternatively, this distance may be selected so as to function with any product transport wheel having product retention pockets, as is best illustrated in FIG. 3.

As should be obvious to one of skill in the art, allowing the product transport wheel 25 to overlie the in-feed conveyor 35 in the manner shown and described facilitates feeding of products P fully into a waiting product retention pocket 30. Similarly, allowing the product transport wheel 25 to overlie the discharge conveyor 35 in the manner shown and described facilitates discharge of all products P from a product retention pocket 30 onto the discharge conveyor 40.

In operation, products P are directed by the in-feed conveyor 35 into an open product retention pocket 30 of the product transport wheel 25 that is located at position A (i.e., aligned with the in-feed conveyor). The products P will advance until the product retention pocket 30 is filled. In this particular case, the products P will advance until the product retention pocket 30 holds eight products. Once the product retention pocket 30 is full, products will begin to stack up at the entrance to the product retention pocket 30 while awaiting advancement of the product transport wheel 25 and alignment of the next open product retention pocket 30 with the in-feed conveyor 35. At this point, the product retention pocket filling process repeats, as it will each time the product transport wheel 25 indexes and there are products in queue.

Once a product retention pocket 30 has been filled at position A, the product transport wheel 25 indexes one step (clockwise, in this example). The term "step" as used herein is intended to mean movement of a product transport wheel such that a product retention pocket thereof is moved from its current position to the position then occupied by the product retention pocket immediately clockwise thereof. Steps comprising other degrees of rotation may be possible in other embodiments of the present invention. Further, product transport wheel indexing may proceed in a counterclockwise direction in other embodiments.

In this exemplary embodiment, each indexing movement of the product transport wheel 25 results in advancement of the next open product retention pocket 30 to position A, and advances the previously filled product retention pocket one step toward the weighing devices 50 and the discharge conveyor 40. In this embodiment, the weighing devices 50 are located at position B. Therefore, once a product retention pocket 30 has been filled, weighing thereof will occur after the product transport wheel 25 has indexed three steps. While weighing occurs in this example after the product transport wheel 25 has advanced three steps, it should be understood by one of skill in the art that the weighing device(s) of other embodiments of a checkweigher of the present invention may be alternatively located such that weighing occurs after a greater or lesser number of steps. Obviously, however, weighing must occur prior to the products reaching the location of the discharge conveyor associated therewith.

Figure 6:
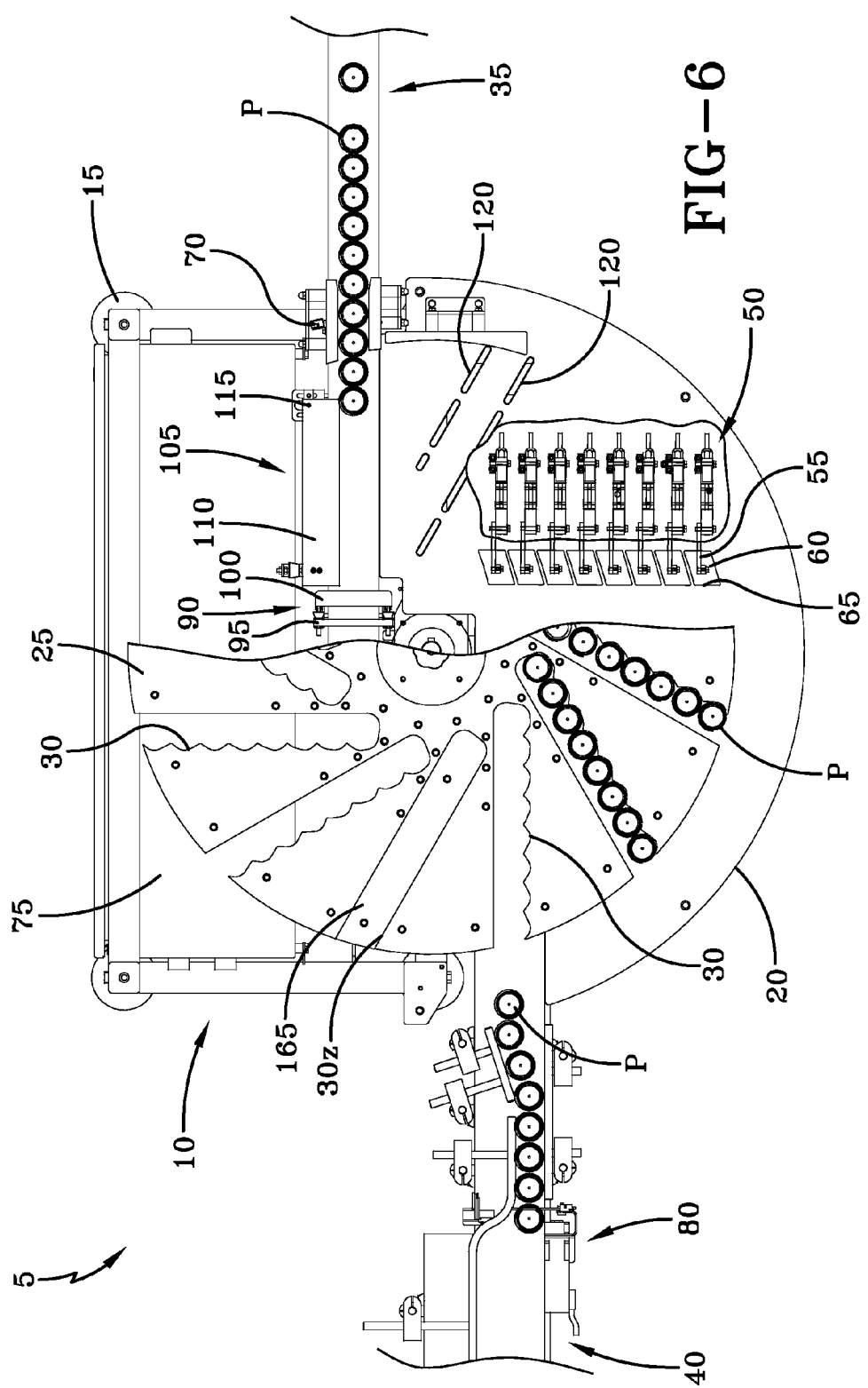
FIG. 6 is an enlarged top view of the intermittent motion checkweigher of FIG. 3 with a number of components removed and in partial cutaway, such that a number of weighing devices and in-feed control elements thereof are visible.

Weighing of the products P by the checkweigher 5 may be better understood by reference to FIG. 6, wherein portions of the product transport wheel 25 and top plate 20 have been cut away to reveal the weighing devices 50 that lie beneath. As shown, the checkweigher 5 includes a number of independent weighing devices 50 for weighing the products P. As this checkweigher 5 is designed to weigh each of the products P in a product retention pocket 30, eight weighing devices are provided. Other numbers of weighing devices may be present in other embodiments of the present invention. Additionally, should it be desired to use a checkweigher of the present invention to provide the collective weight of all the products in a product retention pocket, a single weighing device of sufficient size and capacity may be provided.

As shown in FIG. 6, each weighing device is mounted beneath the top plate 20 on a weighing device support base 85 or similar structure and includes an actuation arm 55 having a product contacting element 60 (e.g., weighpan) that protrudes into an opening 65 in the top plate. The openings 65 are dimensioned to be slightly larger than the overall foot print presented by a bottom surface of the products P to be weighed and are positioned such that the products are fully supported by the weighing devices 50 during the weighing operation without interference or influence from the top plate 20. The position of the product contacting elements 60 of this exemplary embodiment can be seen to coincide with position B of the product retention pockets 30. As such, when the products P in a product retention pocket 30 are moved to position B by the product transport wheel 25, the products become supported on the product contacting elements 60, thereby depressing the corresponding actuation arms 55 and causing the weighing devices 50 to produce a weight reading for each product.

All of the weighing devices 50 of this exemplary checkweigher 5 are shown to be located at one indexing location of the product transport wheel 25 so as to weigh all the products in a given product retention pocket 30 at that location. However, other embodiments are also possible. Particularly, it is possible to distribute the weighing devices of a checkweigher of the present invention so that certain ones of the products in a given product retention pocket are weighed at different product transport wheel indexing positions. For example, and without limitation, in a checkweigher having product retention pockets designed to simultaneously retain eight products, weighing devices may be distributed such that a different pair of the eight products in a given product retention pocket are weighed at four different product transport wheel indexing positions. The weighing of products in this manner may occur in any order and does not require that the products being weighed are adjacent. Such an arrangement may be advantageous when weighing device mounting space at any single product transport wheel indexing position is limited.

In any configuration, the weighing devices 50 are capable of very quickly providing a weight reading of the products P in the corresponding product retention pocket 30 of the product transport wheel 25. Consequently, the product transport wheel 25 may index quite rapidly while still permitting the products P to be weighed while in a static condition. For example, the product transport wheel of a typical checkweigher of the present invention may index at a rate of between approximately 40-80 steps per minute. Faster and slower indexing rates are also possible, however, and the particular rate selected may depend on the product being weighed, the product discharge rate, the diameter and/or weight of the product transport wheel, etc.

Preferably, the weighing devices 50 are re-zeroed at some interval. Re-zeroing of the weighing devices 50 may be accomplished by a number of techniques. One exemplary static technique can be better understood by reference to the exemplary checkweigher 5 as illustrated particularly in FIGS. 2-3 and 6. As shown therein, one product retention pocket $30_Z$ is blocked off with a plate 165 or by another suitable mechanism such that no products P may enter or be retained in the pocket. Consequently, when the product transport wheel 25 advances the product retention pocket $30_Z$ to the position of the weighing devices 50 (i.e., to position B), the weighing devices will perform a weighing operation without any weight being supported by the product contacting elements 60. The effect of performing a weighing operation on the empty product retention pocket $30_Z$ causes the weighing devices 50 to be re-zeroed. Thus, this technique produces a static re-zeroing of the weighing devices 50 once per every complete rotation of the product transport wheel 25.

A static recalibration of the weighing devices 50 may be accomplished in a similar manner. That is, a second product retention pocket may be blocked off (not shown) with respect to receiving and retaining products to be weighed. In this second pocket is located a number (eight in this case) of calibration weights of known mass. Consequently, when the product transport wheel 25 advances the product retention pocket containing the calibration weights to the position of the weighing devices 50 (i.e., to position B), the resulting weight readings produced by the weighing devices are used to establish a new calibration factor (if necessary). Thus, this technique produces a static recalibration of the weighing devices 50 once per every complete rotation of the product transport wheel 25.

While a static re-zeroing procedure like that described above produces good results, it is also apparent that employing such a technique requires the use of a product retention pocket that could otherwise be used for weighing products. This results in a reduction of product throughput. Consequently, a dynamic re-zeroing procedure may be employed in lieu of, or in partial combination with, a static re-zeroing procedure.

In a fully dynamic re-zeroing procedure, no product retention pockets need be blocked off or otherwise prevented from receiving and retaining products to be weighed. Rather, a product transport wheel can be designed such that products retained in the product retention pockets thereof are sufficiently displaced from the center of the wheel so as to afford sufficient time to re-zero the weighing devices between wheel indexing steps. That is, the farther toward the periphery of the product transport wheel the products are maintained, the greater the distance the products must travel between each step of the wheel and the greater the time interval between the departure of one product (or one group of products) from the weighing device(s) and the arrival of the next product (or group of products) thereto. Therefore, by controlling the position of the product retention pockets and the products retained therein, it is possible to provide sufficient time between weighing device contact to allow a re-zeroing of the weighing devices between each indexing step of the associated product transport wheel (or between some predetermined number of steps thereof).

It is also possible to employ a re-zeroing procedure that is comprised of a combination of static and dynamic techniques. For example, a product transport wheel may be provided with a re-zeroing product retention pocket where only the distal half (or some other portion) thereof is sealed off, while the proximal half (or other remaining portion) is allowed to receive and retain products to be weighed. This would allow the weighing devices nearer the center of the product transport wheel (i.e., the weighing devices associated with the blocked portion of the re-zeroing product retention pocket) to be statically re-zeroed as described above, while the weighing devices associated with the product-containing portion of the re-zeroing product retention pocket may be dynamically re-zeroed between indexing steps of the product transport wheel. This technique still results in a number of lost product retention spots in the partially blocked re-zeroing product retention pocket. However, the combined technique also allows the remaining product retention pockets to extend farther into the wheel and to retain more products than may be possible with a fully dynamic re-zeroing procedure.

A similar combined technique may be employed with regard to weighing device calibration. For example, a calibration product retention pocket may have only the distal half (or some other portion) thereof sealed off, while the proximal half (or other remaining portion) is allowed to receive and retain products to be weighed. Calibration weights of known mass would then be placed in the sealed off portion of the pocket for use in the static recalibration of the weighing devices associated with the sealed portion of the pocket. The weighing devices associated with the open portion of the calibration product retention pocket would then be recalibrated by a dynamic calibration principle between indexing steps of the product transport wheel using the known mass as a calibration weight.

A checkweigher of the present invention is not limited to the use of one particular weighing device. For example, weighing devices associated with a checkweigher of the present invention may include, without limitation, load cells of the strain gage variety, force restoration type weigh cells, or devices employing other technologies where actuation of the device results in a weight determination.

Once weighing is complete, continued indexing of the product transport wheel 25 advances the products P from position B toward the discharge conveyor 40. In the particular installation shown in FIGS. 2-5, products P are advanced to the discharge conveyor 40 from weighing position B in three steps. However, as described above with respect to advancement of products P from loading position A to weighing position B, products may be advanced from the weighing location to the discharge location in greater or lesser than three steps in other embodiments of a checkweigher of the present invention.

Automatic operation of the checkweigher 5, and other checkweighers of the present invention, may be accomplished in a number of ways. For example, a product sensor 70 may be located near loading/in-feed position A to detect the presence of one or more products that will collect on the in-feed conveyor 35 once the product retention pocket 30 at the loading position is filled. The sensor may be monitored by a controller 75. Once the sensor 70 remains blocked by a product P for some predetermined amount of time, the drive motor 45 indexes the product transport wheel 25 as described above. The drive motor 45 may be operated by the controller 75, or the drive motor may have its own controller, which is activated upon receipt of a signal from the sensor 70. Indexing of the product transport wheel 25 will repeat each time the sensor 70 becomes blocked for the requisite amount of time. Weighing of products P by the checkweigher 5 will thus proceed as previously described.

Once products P are advanced to the discharge conveyor, the products P may be transported downstream or to other locations for further processing. Further, a rejecter 80 may be associated with the checkweigher 5 to remove products of improper weight from the product stream. As shown the rejecter 80 may include an actuator that can be energized to push, pull or otherwise remove a rejected product P from the discharge conveyor 40. In another embodiment, the rejecter may comprise one or a plurality of trap doors or similar devices that are located in the top plate of the checkweigher. In this manner, rejected products may be removed from the product stream before the rejected products even reach the discharge conveyor. Such a technique ensures that products rejected for improper weight do not accidentally remain in the product stream.

In order to provide the highest possible throughput when using a checkweigher of the present invention, it is desirable to feed products to the product transport wheel and discharge products therefrom as quickly as possible. As discussed above, an increased product discharge rate can be accomplished by using a discharge conveyor that operates at a higher velocity than the in-feed conveyor associated with the checkweigher. Nonetheless, it is also desirable to fill an empty product retention pocket of the checkweigher as quickly as possible. To this end, the in-feed conveyor associated with a checkweigher of the present invention is also typically operated at a high velocity, thereby resulting in products being deposited into the waiting product retention pocket in rapid succession.

While rapid filling of a product retention pocket is desirable from a throughput standpoint, one of skill in the art would also realize that such a rapid introduction of products into a product retention pocket can be problematic. Particularly, as in-feed conveyor velocity increases, product bounce-back (i.e., the tendency of products entering a product retention pocket to contact downstream products and bounce back upstream) also increases. Higher in-feed conveyor velocities also increase the tendency of products to fall over and/or to cause product contents to spill when the product comes to a stop.

To combat the potential undesirable side effects of increased in-feed conveyor velocity, a checkweigher of the present invention may employ a specially designed product stop and/or product guide. For example, referring again to FIG. 6, the exemplary checkweigher 5 can be seen to include a product stop plate assembly 90. The product stop plate assembly 90 is positioned between the product transport wheel 25 and the top plate 20 and extends across the in-feed conveyor 35 at a location wherein a bumper portion thereof substantially coincides with the closed end of a product retention pocket 30 when the product retention pocket is in position A.

This particular product stop plate assembly 90 includes a mounting bracket 95 and a bumper 100. The bumper 100 is preferably constructed of an elastomeric material that is capable of absorbing the contact forces produced by the incoming products P and, thus, minimizes bounce back thereof. Other embodiments of such a stop plate assembly may also include one or more springs or similar devices mounted between the bumper and the mounting bracket to further absorb the forces of incoming products.

In operation, the first product P entering the product retention pocket 30 is advanced toward the closed end thereof until it contacts the bumper 100 of the product stop plate assembly 90. Upon contact, the material of the bumper 100 absorbs much of the energy produced by the moving product, such that its tendency to return upstream is greatly diminished. As each succeeding product enters the product retention pocket 30 and makes contact with the preceding (downstream) product already located in the pocket, the contact force is transmitted through the downstream products and absorbed by the bumper 100. Consequently, the bumper 100 is able to minimize the bounce back tendency of all products that enter the product retention pocket 30.

In lieu of, or in addition to the use of a product stop plate assembly 90 or similar device, a side guide may also be employed to help control products entering a product retention pocket of a checkweigher product transfer wheel at high speed. One embodiment of such a side guide 105 is shown to be installed to the exemplary checkweigher 5 of FIG. 6.

This particular side guide 105 includes a plate 110 that resides between the top plate 20 and product transport wheel 25 and extends along the in-feed conveyor 35. Preferably, the plate 110 is pivotally attached 115 to the frame 10 or another portion of the checkweigher 5 near its upstream end. Such a pivotal attachment allows the plate 110 to be rotated and to be placed at an angle with respect to the in-feed conveyor 35 and to products P entering the product retention pocket 30 thereon. When set at such an angle, the products P are forced into increasing contact with the plate 110 of the side guide 105 as the products move farther into the product retention pocket 30. This contact also helps to reduce the velocity of and improve control over the products. The downstream end of the side guide plate 110 may be disposed against or very near the bumper 100 of the product stop plate assembly 90.

Referring still to FIG. 6, it can be further observed that the top plate 20 of the checkweigher 5 may be provided with features 120 such as runners, slots, grooves, holes, etc., that extend through the top plate. While not essential, such features may be nonetheless advantageous with regard to allowing spilled or excess product to pass through the top plate rather than building up thereon. When present, such features may be disposed over the entire top plate or over only a portion of a top plate of a checkweigher of the present invention. Such features should be of a size and/or shape that prohibits products from passing therethrough as the products are moved across the top plate by the associate product transport wheel.

Figure 7:
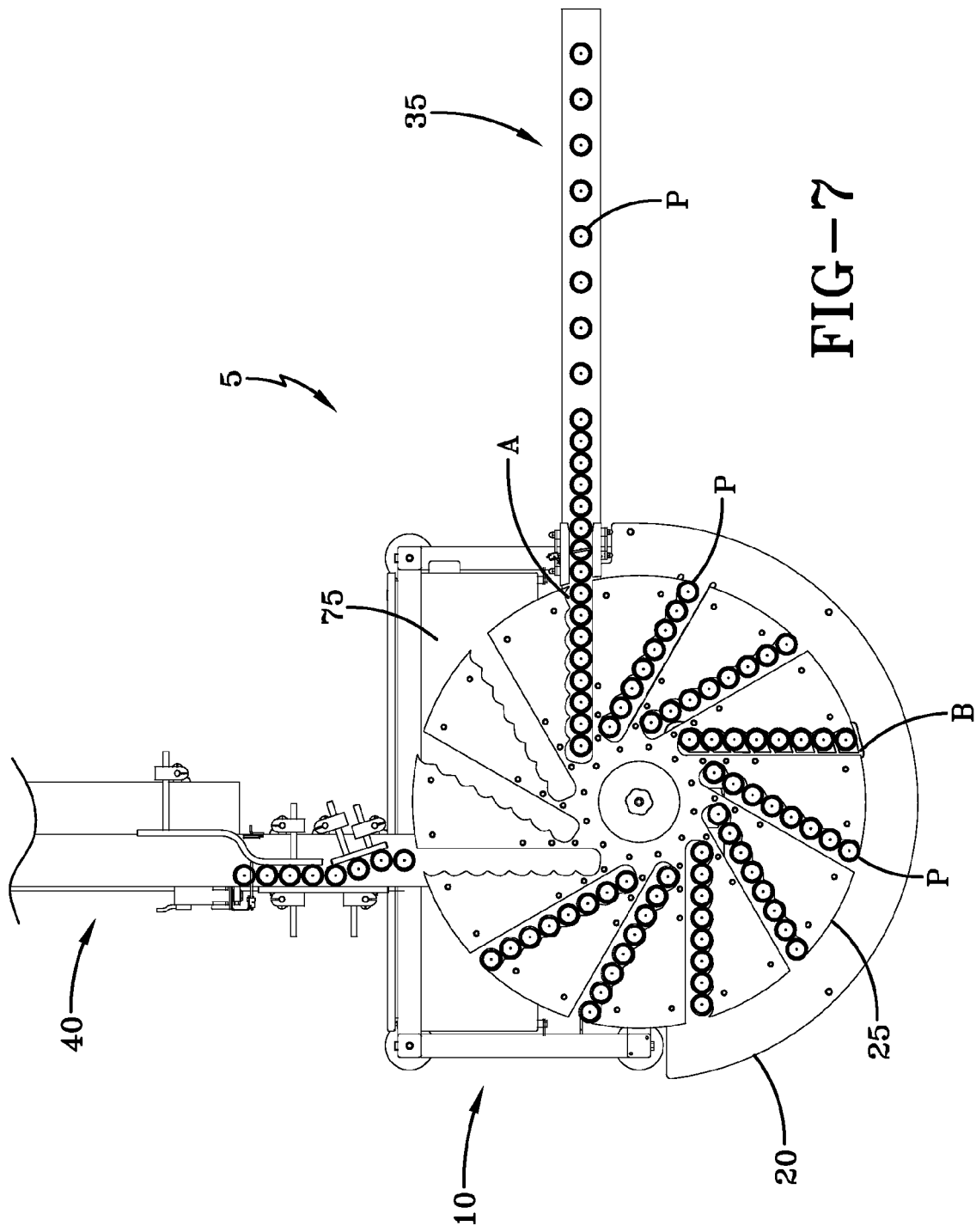
FIG. 7 illustrates an intermittent motion checkweigher of the present invention with an alternative conveyor arrangement.

An alternative installation of the checkweigher 5 of FIGS. 2-6 is depicted in FIG. 7. As shown, the checkweigher 5, and the in-feed and discharge conveyors 35, 40 are the same as those shown in FIGS. 1-5. However, in this installation, the discharge conveyor 40 has been rotated clockwise 90° from the position thereof shown in FIGS. 1-5. Consequently, products P removed by the discharge conveyor 40 will be transported in a direction substantially perpendicular to the direction of travel of the in-feed conveyor 35. Such an installation may be desirable for a variety of reasons, including but not limited to plant or process line layout, and space constraints. It should be realized from the exemplary installation of FIG. 7, that the discharge conveyor may also be placed in other positions, such as any of the product retention pocket 30 index positions existing between weighing position B and the in-feed conveyor 35.

The use of top plate features 115 like those described above and shown in FIG. 6 may be more desirable when a checkweigher of the present invention is used in conjunction with a filler. Because the drive motor of a checkweigher of the present invention is located beneath the product transport wheel, the area overhead of the product transport wheel is generally open. This allows for the possibility of using a filler in conjunction with a checkweigher of the present invention. The filler is operative to fill open containers processed and weighed by the checkweigher. Such fillers would be well known to one of skill in the art.

Figure 8:
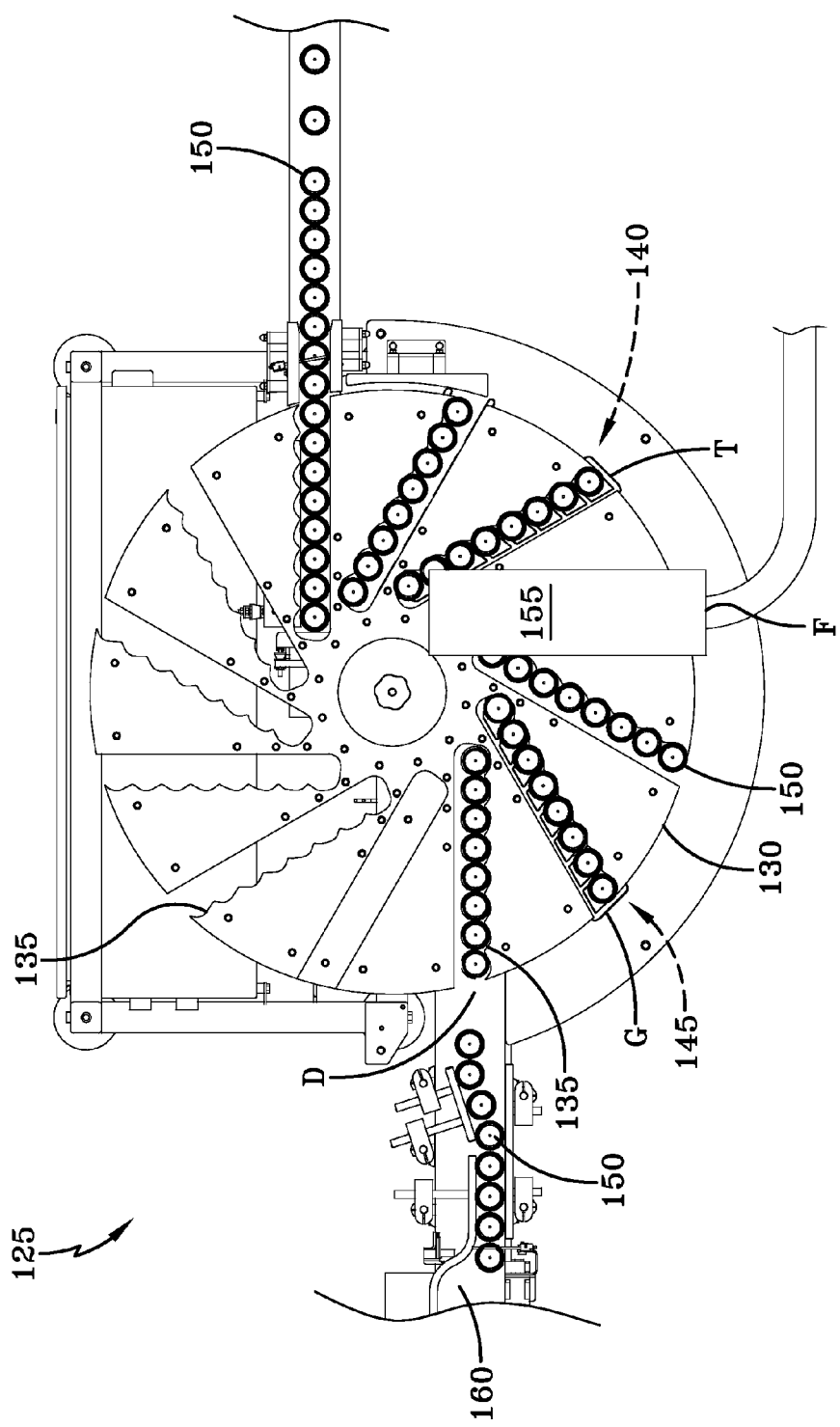
FIG. 8 depicts an exemplary checkweigher of the present invention in a tare-gross configuration with an overhead filler.

The use of such a filler is exemplified in FIG. 8. As shown, a checkweigher 125 of the present invention is provided with a product transport wheel 130 having a plurality of product retention pockets 135 in a similar manner to the checkweigher 5 of FIGS. 2-6. The checkweigher 125 is also operable to weigh products of interest in much the same fashion as described above with respect to the exemplary checkweigher 5 of FIGS. 2-6.

In this particular checkweigher installation, the products are open containers 150. The undermount motor design of the checkweigher 125 advantageously allows the use of a filler 155 (which is only schematically depicted for purposes of simplicity) to fill the containers 150 with a given material (e.g., powder, liquid, tablets, etc.) as the containers are advanced beneath the filler by the product transport wheel 130 of the checkweigher.

The application in which the checkweigher 125 is employed in FIG. 7 is commonly referred to as a tare-gross application because the containers 150 must be weighed both before and after filling by the filler 155. To this end, this particular checkweigher 125 includes two sets of weighing devices 140, 145. A first set of weighing devices 140 is shown to reside at product retention pocket 135 location T (i.e., the tare location). A second set of weighing devices 145 is shown to reside at product retention pocket 135 location G (i.e., the gross weight location).

Once advanced to position T, the first set of weighing devices 140 weighs (tares) the empty containers 150 in the corresponding product retention pocket 135 prior to filling of the containers by the filler 155. The product transport wheel 130 subsequently advances the tared containers 150 until they reside beneath the filler 155, which will typically resides above an indexing position of the product transport wheel. In this particular example, the filler 155 resides one step from the first set of weighing devices 140, at position F. In other embodiments of the present invention, a filler may be placed a greater number of steps from the taring location.

Once the product transport wheel 130 has indexed a group of containers 150 to position F, the filler 155 is operated to fill each container by some amount with a corresponding material. Filling preferably occurs within the interval between indexing steps of the product transport wheel 130. Further indexing of the product transport wheel 130 then advances the filled group of containers toward the second set of weighing devices 145. In this particular example, the second set of weighing devices 145 resides two steps from the filler 155 location. In other embodiments of the present invention, the second set of weighing devices may be placed a greater or lesser number of steps from the location of the filler.

Once advanced to position G, the second set of weighing devices 145 determines the gross weight of the filled containers 150 (i.e., the total weight of each container and the material deposited therein by the filler). After weighing, further indexing of the product transport wheel 130 subsequently advances the filled containers 150 until they reach the discharge position D and are removed from the product transport wheel 125 by the discharge conveyor 160. In this particular example, the discharge conveyor 160 resides one step from the second set of weighing devices 145. In other embodiments of the present invention, a discharge conveyor may be placed a greater number of steps from a second set of weighing devices.

It can be understood by the above description and reference to FIG. 7, that such a tare-gross application of a checkweigher of the present invention allows both filling and requisite weighing functions to be performed within the confines of the checkweigher. Because both pre-filling and post-filling weighing is performed, it is also possible to detect and remove any container that was not properly filled before such container is transferred to a downstream location. Thus, the possibility of placing into commerce an unfilled or improperly filled container is minimized or eliminated. It may also be possible to track the total amount of material dispended by the filler, along with the total amount of accepted and rejected containers to determine if any containers are improperly or inadvertently removed from a process line after leaving the checkweigher or if any material is unaccounted for.

Although the exemplary checkweighers shown herein are depicted as weighing products of substantially circular cross-section, it is possible for a checkweigher of the present invention to be used with products of other cross-sectional shapes. For example, and without limitation, a checkweigher of the present invention may be used to weigh products of square, rectangular or oval cross-section. Such may be accomplished by designing the product retention pockets of the checkweigher product transport wheel to accommodate the particular shape of the products of interest. Whatever the shape of the products of interest, however, it is preferred that the product retention pockets are designed to prevent product-to-product contact therein. Maintaining a slight gap between the products within a given product retention pocket prevents one product from influencing the weight reading of an adjacent product.

While certain embodiments of the present invention are described in detail above, the scope of the invention is not to be considered limited by such disclosure, and modifications are possible without departing from the spirit of the invention as evidenced by the following claims:

What is claimed is:

1. An intermittent motion checkweigher comprising:
   a frame;
   a top plate associated with said frame, said top plate providing a support surface for products to be weighed;
   a rotatable product transport wheel for moving products through a weighing operation of said checkweigher, said product transport wheel having a plurality of offset product retention pockets;
   a drive motor located below said product transport wheel for producing intermittent rotation thereof; and
   at least one weighing device having at least an actuation portion thereof exposed through a corresponding opening in said top plate, said at least one weighing device located along the path through which a product to be weighed is moved by said product transport wheel so as to provide a reading indicative of the weight of said product.

2. The intermittent motion checkweigher of claim 1, wherein each product retention pocket of said product transport wheel is configured to simultaneously retain a plurality of products to be weighed.

3. The intermittent motion checkweigher of claim 2, wherein the number of weighing devices present is equal to the number of products that each product retention pocket of said product transport wheel is configured to simultaneously retain.

4. The intermittent motion checkweigher of claim 1, wherein said drive motor indexes said product transport wheel in steps, each step aligning a new product retention pocket with said at least one weighing device.

5. The intermittent motion checkweigher of claim 1, wherein said product transport wheel is comprised of two plates separated by a number of spacers.

6. The intermittent motion checkweigher of claim 1, wherein said drive motor is located below said top plate.

7. The intermittent motion checkweigher of claim 1, further comprising a number of openings in said top plate to allow for the passage of spilled or excess material therethrough.

8. The intermittent motion checkweigher of claim 1, further comprising a product stop plate assembly, said product stop plate assembly located near an in-feed position of said product transport wheel to reduce the tendency of a product entering a corresponding product retention pocket to bounce back in an upstream direction.

9. The intermittent motion checkweigher of claim 8, wherein said product stop plate assembly includes an elastomeric bumper.

10. The intermittent motion checkweigher of claim 1, wherein one product retention pocket of said product transport wheel is provided with at least one calibration weight of known mass, said calibration weight used to recalibrate, when necessary, a weighing device that coincides with the location of said calibration weight.

11. The intermittent motion checkweigher of claim 1, wherein one product retention pocket of said product transport wheel is blocked in a manner that prevents entry and retention of products, the presence of said blocked pocket resulting in a static re-zeroing of said weighing devices each time the blocked pocket coincides with the location of said weighing devices.

12. The intermittent motion checkweigher of claim 1, wherein said product retention pockets are dimensioned to permit said weighing devices to be re-zeroed between each movement of said product transport wheel.

13. The intermittent motion checkweigher of claim 1, further comprising a filler positioned above said product transport wheel to fill open container products with a desired material when said open container products are positioned beneath said filler by said product transport wheel.

14. The intermittent motion checkweigher of claim 13, wherein at least one weighing device is provided to weigh an open container product prior to said open container product reaching said filler and at least one weighing device is provided to weigh said open container product after said open container product has been filled by said filler.

15. The intermittent motion checkweigher of claim 1, further comprising an in-feed device for supplying products to said product retention pockets of said product transport wheel and a discharge device for removing products from said product retention pockets of said product transport wheel, the velocity of said discharge device being greater than that of said in-feed device.

16. An intermittent motion checkweigher for weighing containers, comprising:
   a frame;
   a top plate associated with said frame, said top plate providing a support surface for containers to be weighed;
   a rotatable container transport wheel disposed above said top plate, said container transport wheel having a plurality of offset container retention pockets for retaining containers to be weighed as said containers are moved across said top plate and through a weighing operation of said checkweigher by said container transport wheel;
   a drive motor located below said container transport wheel for producing intermittent rotation thereof;
   a filler positioned above said container transport wheel to fill containers with a desired material when said containers are positioned beneath said filler by said product transport wheel;
   at least one first weighing device having at least an actuation portion thereof exposed through a corresponding opening in said top plate, said at least one first weighing device located to reside along the path through which a container to be weighed is moved by said container transport wheel and to weigh an open container prior to said open container reaching said filler; and
   at least one second weighing device having at least an actuation portion thereof exposed through a corresponding opening in said top plate, said at least one second weighing device located to reside along the path through which a container to be weighed is moved by said product transport wheel and to weigh said container after said container has been filled by said filler.

17. The intermittent motion checkweigher of claim 16, wherein each container retention pocket of said container transport wheel is configured to simultaneously retain a plurality of containers to be weighed.

18. The intermittent motion checkweigher of claim 16, wherein said drive motor indexes said container transport wheel in steps, each step aligning a new container retention pocket with said weighing device(s).

19. An intermittent motion checkweigher for individually weighing a plurality of products, comprising:
   a frame;
   a top plate associated with said frame, said top plate providing a support surface over which products to be weighed are moved;

a rotatable product transport wheel disposed above said top plate, said product transport wheel having a plurality of offset product retention pockets, each of which is designed to retain a plurality of products to be weighed as said products are moved across said top plate and through a weighing operation of said checkweigher by rotation of said product transport wheel;

a drive motor located below said top plate and in line with a central axis of said product transport wheel, said drive motor connected to said product transport wheel to produce an indexing rotation thereof;

a plurality of weighing openings in said top plate, said openings present in a number that is at least equal to the number of products that each product retention pocket of said product transport wheel is configured to simultaneously retain, said openings located to coincide with the path through which each product retained within a product retention pocket is moved by said product transport wheel and dimensioned to be larger than the footprint presented by said products;

a plurality of weighing devices, said weighing devices present in a number that is at least equal to the number of products that each product retention pocket of said product transport wheel is configured to simultaneously retain, each weighing device having at least an actuation portion thereof exposed through a corresponding one of said openings in said top plate so as to support a product when positioned over an associated weighing opening and to provide a reading indicative of the weight of said product; and a controller in communication with at least said drive motor so as to control the indexing rotation thereof;

wherein said product retention pockets are arranged to receive products at an in-feed position of said product transport wheel, said in-feed position being upstream of said weighing devices; and wherein said product retention pockets are arranged for removal of products at a discharge position of said product transport wheel, said discharge position being downstream of said weighing devices.

20. The intermittent motion checkweigher of claim 19, further comprising a filler positioned above said product transport wheel to fill open container products of a product retention pocket with a desired material when said open container products are positioned beneath said filler by said product transport wheel.

21. The intermittent motion checkweigher of claim 19, wherein a first set of weighing devices is provided to weigh the open container products of a product retention pocket prior to said open container products reaching said filler, and a second set of weighing devices is provided to weigh the open container products of said product retention pocket after said open container products have been filled by said filler.

* * * * *